United States Patent

Renard et al.

[11] Patent Number: 5,989,136
[45] Date of Patent: Nov. 23, 1999

[54] GOLF BALL

[75] Inventors: Philippe Renard, La Balme de Sillingy, France; Dean Snell, Oceanside, Calif.

[73] Assignee: Taylor Made Golf Company, Inc., Carlsbad, Calif.

[21] Appl. No.: 08/954,906

[22] Filed: Oct. 21, 1997

[51] Int. Cl.[6] .................................................. A63B 37/06
[52] U.S. Cl. ........................ 473/376; 473/373; 473/377
[58] Field of Search .................... 473/365, 373, 473/376, 378, 377, 374

[56] References Cited

U.S. PATENT DOCUMENTS

| | | | |
|---|---|---|---|
| 3,177,280 | 4/1965 | Fordt et al. | 473/373 X |
| 4,272,079 | 6/1981 | Nakade et al. | 473/365 X |
| 4,919,434 | 4/1990 | Saito | 473/376 X |
| 5,674,137 | 10/1997 | Maruko et al. | 473/378 X |
| 5,820,488 | 10/1998 | Sullivan et al. | 473/374 |
| 5,830,087 | 11/1998 | Sullivan et al. | 473/373 X |

*Primary Examiner*—George J. Marlo
*Attorney, Agent, or Firm*—Knobbe, Martens, Olson & Bear, LLP.

[57] ABSTRACT

A solid golf ball having a core, a covers an intermediate layer between the core and the cover formed of a soft elastomeric material. Preferably, the layer has a thickness of 0.1–1.3 mm and is formed by dipping the core into a liquid dispersion latex having a cured hardness between 40 and 100 Shore A. The ball provides improved feel and controllability which can be varied by varying the characteristics of the intermediate layer.

4 Claims, 3 Drawing Sheets

GOLF BALL

FIELD OF THE INVENTION

The invention is directed to a multi-layered golf ball which is easily controlled. The invention also relates to the method of manufacturing the same.

BACKGROUND AND SUMMARY OF THE INVENTION

It is known to form solid golf balls by covering a solid polybutadiene rubber core with a thermal plastic resin cover. Solid golf balls having a cover of ionomer-base material have superior durability and good flight performance. Unfortunately, in comparison with a thread wound golf ball, a solid golf ball is more difficult to control, particularly when the ball is struck with a middle or iron. Additionally, the solid golf ball has an undesirable "feel" upon striking, due to the relative hardness of the cover. For this reason, most professional golfers do not use solid golf balls in tournaments. Previous attempts to improve the "feel" of conventional solid golf balls have focused on lowering the hardness of the solid core and forming the cover of softer material. Neither of the solutions has proven satisfactory because they sacrifice flight performance and durability.

Thread wound golf balls also have drawbacks. Specifically, thread wound golf balls have relatively poor durability (cut resistance and fatigue resistance) and do not fly the same distance as solid golf balls, overall. Further, thread wound golf balls are more complicated and expensive to manufacture. Thread wound golf balls are manufactured by winding a natural or synthetic rubber thread around a liquid and/or solid center until the desired diameter is reached. To achieve the desired characteristics, numerous parameters must be controlled, such as center size and type, winding tension, thread size and thickness. As will be appreciated, it is difficult to control these parameters in the manufacturing environment. Controlling these parameters requires sophisticated winding and tensioning apparatus.

The elastic thread of the wound balls must be wound under high tension to produce a ball which will achieve high velocity. Because of this high tension, however, there is a risk of thread snap during winding and later manufacturing steps. For example, it is difficult to ensure that the wound subassembly is concentric. This requires control of the parameters outlined above, as well as the rotational position of the center.

The thread used in such golf balls is also sensitive to heat, thereby limiting the options available to apply the cover around the wound center. For example, injection molding a cover around a wound subassembly will typically cause the thread to snap during the molding process.

Accordingly, there is a need for a golf ball having the long flight and ease of manufacturability of two-piece golf ball and, at the same time, the benefits of greater control and better feel provided by a thread wound golf ball.

One aspect of the invention is a golf ball having a core, a cover, and an intermediate skin between the core and cover. The intermediate layer is a soft elastomeric material applied around the core from a liquid dispersion so that the material has substantially the same properties of elasticity and softness as said material prior to being formed over said core. Preferably, this intermediate layer is formed by dipping.

It has been determined that a golf ball having an intermediate layer of soft elastomeric material formed by dipping can provide unexpectedly improved controllability. Resulting in a solid golf ball having controllability very similar to thread wound golf balls. Specifically, the intermediate soft elastomeric layer can improve controllability by increasing the spin rate of the ball when the ball is hit with short irons. Advantageously, these benefits an be achieved while still providing the benefits of a two-piece golf ball.

Desirably, the elastomeric material may also provide a soft feel, whose effect may be adjusted by varying its thickness, hardness, and relative position from the ball surface. When the elastomeric material is applied to the core by dipping, it maintains its original properties of elasticity and softness, because the dipping technique preserves the natural chain structure of the elastomer. This is in contrast to the degrading of the structure which occurs in long kneading operations, commonly used in connection with molding and curing techniques.

By applying the intermediate layer through dipping, a very thin and homogeneous soft intermediate layer can be applied. These thin and homogeneous thicknesses are not achievable by conventional molding techniques used commonly to cover the core with a plastic layer.

Another aspect of the invention is a method of manufacturing a golf ball, including providing a core, dipping the core in a bath comprising a dispersion of elastomeric material to produce a thin layer of elastomeric material around the core, drying the layer, and molding an outer cover around the dried elastomeric layer.

Advantageously, this process permits a core to be covered with a soft rubber layer having a very small thickness. Such small thicknesses are difficult to achieve by other techniques. Advantageously, this process lends itself to a wide variety of rubber materials, and intermediate layers having different thicknesses and hardnesses.

Importantly, the process is particularly suited to economical manufacturing techniques. The system uses only low weight, low cost and low energy consuming machines.

Additionally, this technique protects the core structure from deterioration. Specifically, the core typically degrades in the presence of high temperatures. For example, high temperatures tend to reduce the restitution of the core or rebound energy of the core.

Yet another aspect of the present invention is a method of manufacturing a golf ball wherein a thin intermediate layer is formed by at least two consecutive dipping steps in different baths of elastomeric materials to produce at least two coats of soft elastomeric material around the core. Preferably, these materials have a different hardness, so that the properties of the golf ball can be precisely controlled by "blending" the characteristics of the materials in each of the two baths.

DETAILED DESCRIPTION OF THE PREFERRED EMBODIMENT

Figure 1:
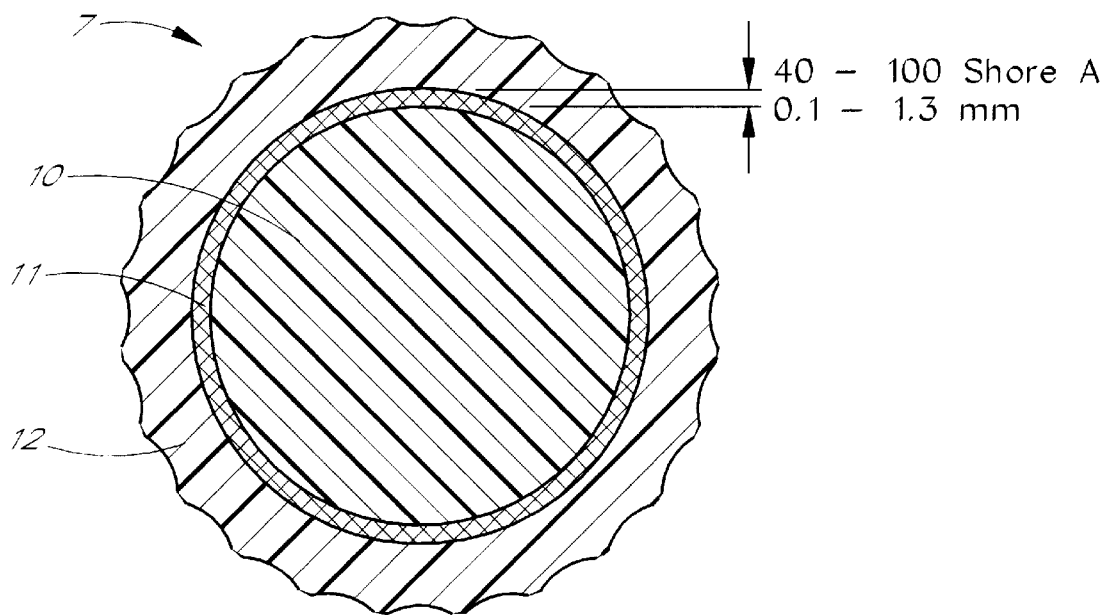
FIG. 1 illustrates a cross-sectional view of a solid golf ball of the present invention.

FIG. 1 shows a preferred embodiment of a golf ball 1 comprising a solid center or core 10, an intermediate layer 11 of soft polymeric material surrounding the core and a cover 12 of thermoplastic material positioned around the intermediate layer 11.

The core 10 is preferably formed of the solid polymeric material. Suitable polymeric material may comprise either a rubber or a plastic. In a preferred example, the core contains 1,4-polybutadiene having more than 40% by weight of the cis structure. Desirably, the cis structure is at least 90% by weight of the polybutadiene. Other rubbers, including natural and synthetic rubbers can be utilized in connection with the 1,4-polybutadiene. The material desirably also contains a cross-linking agent, such as a metal salt of an unsaturated fatty acid. Such a salt could be a zinc salt, or magnesium salt of an unsaturated acid such as methacrylic acid or acrylic acid, or an ester. The core may also include a filler, preferably comprising a metal oxide or salt such as zinc oxide, barium sulfate, calcium carbonate, silica, or calcium oxide. Further, a polymerization initiator may be included, preferably an organic peroxide such as dicumyl peroxide.

For a struck golf ball to rebound with the desired characteristics off the face of a club head, the core, which is the "engine" of the golf ball, must have certain physical properties. These properties are greatly influenced by its size and its PGA compression value. Advantageously, the ball has a compression value between 30–100, for a core diameter between 1.34 and 1.60 inches. The PGA compression value is determined by measurement with a standard ATTI compression gauge known to those in the art.

Significantly, the layer 11 of soft elastomeric material is applied to the core 10 through a dipping process. Desirably, the elastomeric material is between 40–100 shore A, and is preferably between 45–90 shore A. As will be explained in connection with the test results outlined below, providing an intermediate layer 11 having a hardness within the described ranges, has an unexpectedly dramatic impact on the spin rate of the golf ball. As a result, the spin rate of the ball can be adjusted by providing an intermediate layer having certain characteristics.

The intermediate layer 11 is much softer than the core 10 or the cover 12. The intermediate layer 11 should desirably be very thin. Preferably, the thickness of the intermediate layer 11 is between 0.1 to 1.3 millimeters. Under 0.1 millimeters, the layer has insufficient strength and tends to shear during manufacture, or after the golf balls struck relatively few times. On the other hand, if the thickness of the intermediate layer 11 is higher than 1.3 millimeters, the affect of the intermediate layer on the behavior of the ball is too great. Specifically, an intermediate layer thicker than 1.3 millimeters would cause a cushion effect, which would tend to dramatically decrease the ball speed and flight distance.

The intermediate layer 11 is preferably an elastomeric material which can be applied by dipping. In particular, the preferred materials are latex-based materials. Advantageously, the intermediate layer 11 is comprised of one of the group of natural latex, synthetic polyisoprene, polychloroprene butadiene-acrylonitrile copolymer, butyl-epoxied natural rubber, latex and viton latex, and blends thereof.

The cover 12 may comprise any kind of polymeric material satisfactory for use in making covers for golf balls. As discussed above, the present invention is desirable in that it facilitates the use of a wide variety of covers and the application of these covers through a wide variety of means. The cover may comprise one or more layers of thermoplastic material. Advantageously, however, the cover may be an ionomer (such as the variety of ionomers sold by DuPont Chemical Co. under the trademark SURLYN), polyether block amide (such as PEBAX sold by the French company Atochem), polyether block ester (such as PEBE sold by DuPont under the trademark HYTREL), polyurethane, or balata (a naturally occurring substance or its synthetic equivalent commonly sold by Kuraray Isoprene Co., Ltd.). The cover may also be made of various blends of these materials.

Desirably, the cover 12 has an outside diameter of between 1.680 and 1.72 inches and has a thickness between 0.3 and 4.0 millimeters.

The method of manufacturing the golf ball of FIG. 1 will now be described.

The core 10 or center may be formed by any technique known to those of skill in the art. Typically, when a polybutadiene core of the aforementioned characteristics is used, the core 10 will be prepared by means of mixing the components and kneading in a kneader. The core is then cured in a spherical mold of the desired diameter under heat and high pressure. Alternatively, if the core is made of thermoplastic base material, the core 10 may be molded by injection molding.

Figure 2:
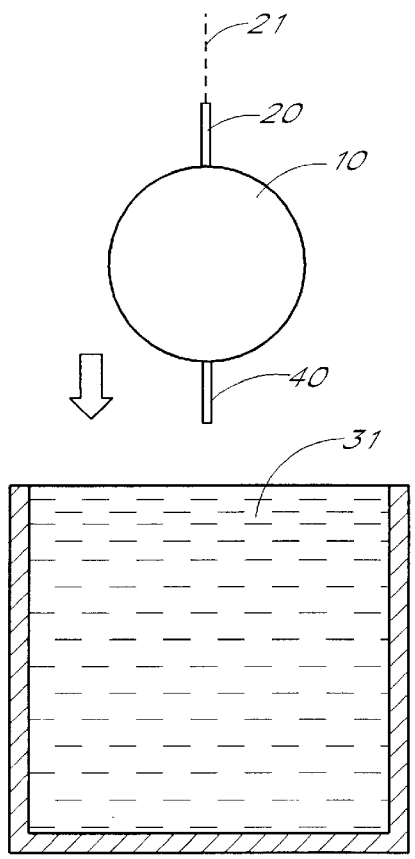
FIG. 2 illustrates a core descending into a bath, in accordance with the inventive process.
Figure 3:
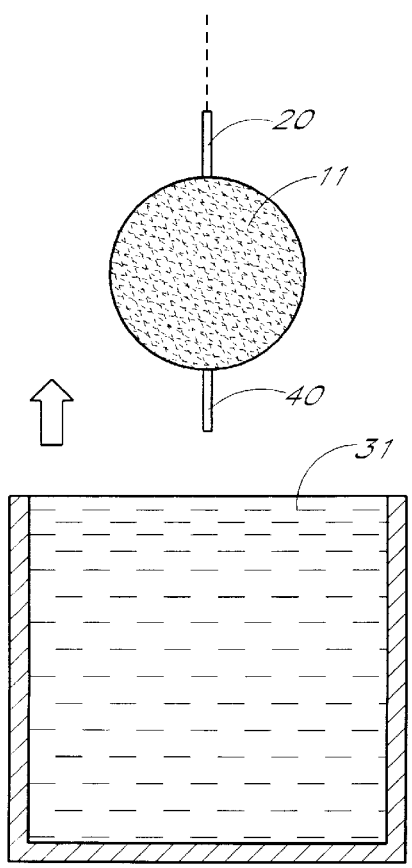
FIG. 3 illustrates the subassembly ascending from a bath in accordance with the process of the present invention.

Referring to FIGS. 2 and 3, the next operation consists of dipping the core 10 into a liquid bath 31 comprising a dispersion of polymeric material. An alternative operation would be to apply the liquid dispersion of elastomer by spraying fine drops of the dispersion on the surface of the core by use of suitable means, such as a spray gun. For example, the core 10 is preferably held by an suitable holder, such as a pin or needle 20 which enters at least partly into the core. Desirably, the needle 20 is attached to a positioner, such as an arm or a cable 21. The positioner could be flexible or rigid, and could be a rod, a cord, or other suitable device. Desirably, the holder 21 includes a second portion, such as a second needle 40 which desirably extends at least partially into the core 10 opposite the first needle 20. Likewise, the positioner may include a second portion, such as a armor second cable for holding the second needle to permit the core to be more securely held and be manipulated in all directions after dipping to ensure an homogeneous thickness distribution of the latex layer around the core and also prevent formation of a latex drop in a particular area of the surface.

Figure 5:
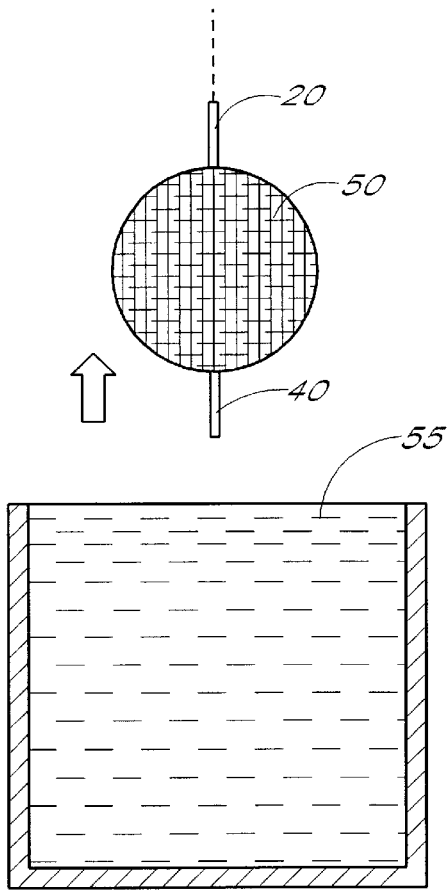
FIG. 5 illustrates the core being dipped in a bath to form a protective coating.

The core 10 is generally made of a hygroscopic material which tends to absorb natural moisture from its outside environment. Since moisture absorption affects the physical and mechanical characteristics of the ball, such as weight, initial velocity, etc., it is preferred that the core 10 be pretreated with a protective coating and desirably a hydrophobic protective coating 50 to prevent the core 30 from absorbing water during the dipping process. Specifically, the protective coating 50 desirably prevents the core from absorbing water from the elastomeric dispersion. The protective coating 50 may be a primer, which also promotes adhesion, such as an epoxy adhesive, an oil or a solvent, such as toluene. Advantageously, the core 10 can be pretreated with a protective coating simply by dipping the core 10 into a bath 55 (FIG. 5), or spraying or coating the core with a hydrophobic material. The protective coating need only protect the core until the elastomeric intermediate layer 11 is completely cured. Thereafter, the intermediate layer 11 itself will protect the core 10.

Figure 6:
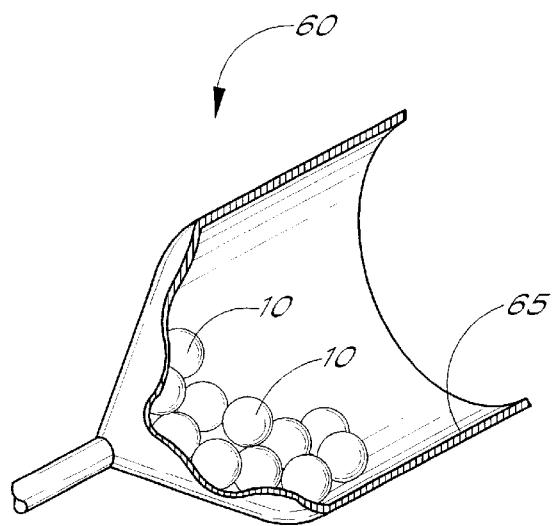
FIG. 6 illustrates cores being tumbled in a sandpaper coated tumbler to form a roughened surface.

To ensure that the intermediate layer 11 bonds properly with the core 10, the surface of the core may advantageously be roughened through any suitable process, such as by a technique known as "centerless grinding" on a Glebar machine, polishing, tumbling and the like. As illustrated in FIG. 6, this operation may be performed quickly and easily by rotating a large number of cores 10 in a rotating tumbler 60 lined with a layer of sandpaper 65 for a predetermined time.

Another important aspect of the invention is that the thickness of the intermediate layer 11 can be precisely controlled through numerous successive dipping operations. The thickness of the layer can also be significantly influenced by the viscosity of the dispersion bath 31, the speed in which the core 10 is lowered into the bath 31, the speed of assent of the core from the bath, and the surface roughness of the core. The core 10 can also be dipped in a coagulating bath before the core is dipped into the dispersion bath to increase the thickness of the polymeric layer.

Depending upon the nature of the intermediate layer 11 desired, this process also lends itself to dipping the core into at least two separate dispersion baths of elastomeric material to produce an intermediate layer comprising at least two coats of soft elastomeric material around the core, with each coat having a different hardness. Through the application of multiple coats of different hardness, the gradient of hardness of the intermediate layer 11 can be customized with great precision.

The coagulating bath may desirably contain a solvent of bivalent metallic ion, such as calcium nitrate solubilized in alcohol, such as methylic alcohol and water. Beneficially, dipping preserves the natural chain structure of the elastomer, in contrast to kneading operations which are used in molding and curing techniques. As will be appreciated, controlling of the thickness of the individual coats of the intermediate layer 11 can also be achieved as outlined above in connection with a one coat intermediate layer.

Figure 4:
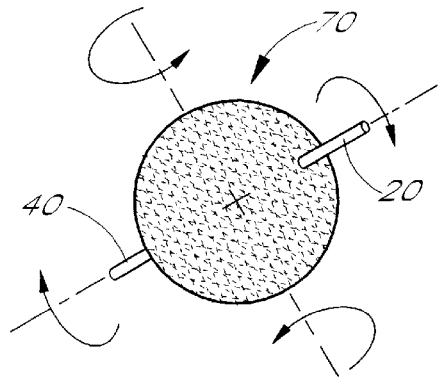
FIG. 4 illustrates the spinning of the subassembly to achieve a homogenous thickness.

Desirably, after the core has been dipped, the subassembly 70 (i.e., the core surrounded by the intermediate layer) is rotated in various directions, as illustrated in FIG. 4, to provide a more homogeneous intermediate layer and avoid the formation of drops of elastomeric material. Thereafter, the subassembly is dried or cured in an oven at a temperature of approximately 100° F. for about three to five minutes. As will be appreciated, the temperature and time necessary for curing will vary significantly depending upon various factors, such as type of material, percentage of solid in the dispersion, the thickness of the intermediate layer, etc. Desirably, however, the drying operation should be as short as possible, so that the drying operation does not alter the initial properties of the core. To minimize the exposure of the core to above ambient temperatures, the dispersion bath 31 may advantageously be provided with curing accelerators such as zinc, diethyldithiocarbamate, in a ratio of one part per 100 parts of latex. To expedite the manufacturing process, the drying operation can be performed while the subassembly is rotated in various directions.

Once the subassembly is sufficiently dried, the cover 12 can be formed around the subassembly. This can be done through various well-known techniques. Desirably, the cover 12 is attached by injection molding directly around the intermediate layer 11. Desirably, this injection molding process takes about 30 to 120 seconds at a temperature of approximately 250° F. to 500° F. The core is desirably held during the injection molding process by a plurality of pins which are then retracted after the molten material has been injected.

It has been determined, however, that retraction of the pins creates a vacuum which tends to locally stretch the intermediate layer outwardly and may cause a small portion of the intermediate layer to extend through the cover of the golf ball. This problem, however, has been overcome. Specifically, one advantageous method for addressing this problem is to refrigerate the subassembly 70 prior to injection molding, until the crystallization point of the intermediate layer 11 has been reached. The subassembly should then be maintained at a temperature where the intermediate layer will remain at its crystallization stage until the cover is injected. Preferably, for a latex, the temperature will be between −80° C. and −10° C., depending upon the nature of the latex. Preferably, when this method is used to form the cover, the intermediate layer is comprised of polychloroprene, because it crystallizes as a temperature of −10° C. to −20° C.

Another possible approach to preventing the intermediate layer 11 from extending through the cover 12 is to adhere the intermediate layer 11 to the outer surface of the core 10 by applying an adhesive, such as epoxy before the subassembly is dipped. Another possible solution would be to apply a thin coat of very hard material over the soft intermediate layer to prevent the soft intermediate layer from stretching under the vacuum. The thin hard coat could be applied by spraying, fluid bath, dispersion, or other suitable technique. Preferably, the hard coat would be a material which adheres well to at least one and, preferably, both the material of the intermediate layer and the material of the cover.

The cover may also be formed through compression molding. According to this process, hemispherical shells are formed by injection at a temperature of about 200° F. to about 500° F. over about 30 to 60 seconds. The smooth surfaced hemispherical shells are then positioned around the subassembly 70 in a mold spaced from the subassembly in a manner to form the desired cover thickness and are subjected to compression molding in dimpled mold forms under heat and pressure for about two to four minutes, until the shells are fused together to form a unitary ball. Thereafter, the ball is allowed to cool in the mold until the cover is hard enough to be removed without being deformed.

After the ball is molded, the ball may undergo various further processing steps, such as buffing, painting and printing, as known in the art.

Test Results

As discussed above, an important aspect of the invention is a multi-layered golf ball which has a better feel and greater controllability than a conventional two-piece golf ball. Specifically, it is desired to achieve an easily manufactured two-piece golf ball having the controllability and feel of a thread wound ball.

To illustrate the characteristics of golf balls manufactured in accordance with the method of the present invention, the following golf balls were manufactured and tested. For purposes of illustration, these golf balls are designated as follows: LX-001, LX-002, LX-003, LX-004 and LX-005.

LX-001 comprises a solid polybutadiene core, a soft natural rubber latex intermediate layer having a hardness of about 45 Shore A, and a cover comprising a blend of 40% by weight of PEBAX 2533 and 55% by weight of high-acid SURLYN AD 8546.

LX-002 is the same as LX-001, except that the latex intermediate layer has a hardness of 65 Shore A.

LX-003 is the same as LX-001, except that the latex intermediate layer has a hardness of 75 Shore A.

LX-004 is the same as LX-001, except that the latex intermediate layer has a hardness of 85 Shore A.

LX-005 is the same as LX-001, except that the cover comprises 50% by weight of high acid SURLYN 9120 and 50% by weight of high acid SURLYN 8140.

LX-C is the same as LX-005, except that it does not have an intermediate layer. Additionally, Applicant tested the "professional" golf ball from TITLEIST, and the "tour balata" from TITLEIST.

The foregoing balls were then tested as follows. Each ball was tested with a driver and an eight iron. For the driver, a TAYLORMADE titanium 8.5 degree loft driver was used to launch the test control ball (PINNACLE Gold) at 160 miles per hour; a nine degrees initial starting angle; and 3,000 r.p.m. backspin. This test is similar to that of U.S.G.A. distance test set-up procedures.

The eight iron test was set up with a TAYLOR-MADE "BURNER" iron, tested at a swinging speed of 88 m.p.h. Backspin was measured initially as the ball left the club face.

The test results are summarized below:

TABLE 1

|  | LX-001 | LX-002 | LX-003 | LX-004 | LX-005 | LX-C |
|---|---|---|---|---|---|---|
| CORE: | | | | | | |
| TYPE | PB* | PB | PB | PB | PB | PB |
| SIZE (in in.) | 1.55 | 1.55 | 1.55 | 1.55 | 1.55 | 1.55 |
| COMPRESSION | 70 | 70 | 70 | 70 | 70 | 70 |
| MANTLE: | | | | | | |
| SIZE (in in.) | 1.58 | 1.58 | 1.58 | 1.58 | 1.58 | — |
| HARDNESS | 45 A | 65 A | 75 A | 85 A | 45 A | — |
| TYPE | Latex | Latex | Latex | Latex | Latex | — |
| THICKNESS | 0.015 | 0.015 | 0.015 | 0.015 | 0.015 | — |
| COVER: | | | | | | |
| THICKNESS (in in.) | 0.05 | 0.05 | 0.05 | 0.05 | 0.05 | 0.065 |
| TYPE | Δ 45% wt PEBAX 2533 55% wt SURLYN AD8546 | SAME Δ | SAME Δ | SAME Δ | 50% wt 9120** 50% wt 8140*** | 50% wt 9120 50% wt 8140 |
| BALL: | | | | | | |
| COMPRESSION | NA | NA | NA | 65 | 80 | 83 |
| WEIGHT (in oz.) | NA | NA | NA | 1.629 | 1.620 | 1.606 |
| PERFORMANCE: | | | | | | |
| 8-IRON SPIN (rpm) | 8200 | 8100 | 8170 | 9150 | 7980 | 6760 |
| LAUNCH ANGLE (deg.) | 19.2 | 19.3 | 19.3 | 18.2 | 18.7 | 20.5 |

*PB is polybutadiene rubber.
**9120 is SURLYN 9120 sold by DuPont.
***8140 is SURLYN 8140 sold by DuPont.

COMPARATIVE TABLE

|  | PROFESSIONAL | TOUR BALATA |
|---|---|---|
| CORE: | | |
| TYPE | WOUND | WOUND |
| COVER: | | |
| TYPE | Urethane | Balata |
| HARDNESS | 57 D | 48 D |
| THICKNESS (in in.) | 0.05 | 0.04 |
| BALL: | | |
| COMPRESSION | 95 | 87 |
| WEIGHT (in oz.) | 1.61 | 1.61 |
| PERFORMANCE: | | |
| 8-IRON SPIN (rmp) | 7520 | 9170 |
| LAUNCH ANGLE (deg.) | 19.8 | 19 |

As is apparent from the table, particularly with respect to the LX-005 and comparative example LX-C, the ball of the present invention provides significantly high spin rate and, therefore, high controllability. Examples LX-001 to LX-004 show how the spin rate can be adjusted as a function of the hardness of the latex in the intermediate layer. Importantly, the test results demonstrate that spin rate values very close to that of wound golf balls can be achieved by the present invention.

It will be readily appreciated by those skilled in the art that modifications may be made without departing from the concepts disclosed herein. Such modifications are to be considered included in the following claims, unless these claims by their language expressly state otherwise.

We claim:

1. A golf ball comprising:

a solid core and a cover; and an intermediate thin layer of a soft elastomeric material disposed over said core and beneath said cover, the hardness of said thin layer being between 40 and 90 Shore A and wherein said thin layer of soft elastomeric material has a thickness of 0.1–1.3 mm and structural characteristics resulting from being formed by dipping said core into a liquid dispersion of said soft elastomeric material.

2. The golf ball of claim 1, wherein said intermediate thin layer is made of a latex-base material.

3. The golf ball of claim 1, wherein said soft elastomeric material is chosen among natural latex, synthetic polyisoprene, polychloroprene, butadiene-acrylonitrile copolymer, butyl latex, epoxized natural rubber, viton latex, and blends thereof.

4. The golf ball of claim 1, wherein said cover comprises at least one layer chosen among ionomers, polyether block amide, polyether block ester, polyurethane, balata, and blends thereof.

* * * * *

UNITED STATES PATENT AND TRADEMARK OFFICE
CERTIFICATE OF CORRECTION

PATENT NO.   : 5,989,136
DATED        : November 23, 1999
INVENTOR(S)  : Renard et al.

It is certified that error appears in the above-identified patent and that said Letters Patent is hereby corrected as shown below:

<u>Title page,</u>
Item [57] ABSTRACT,
Line 1, "a core, a covers an intermediate layer" should be changed to -- a core, a cover, an intermediate layer --

<u>Column 5,</u>
Line 54, the comma "," after "zinc" should be cancelled.

Signed and Sealed this

Twenty-seventh Day of May, 2003

JAMES E. ROGAN
*Director of the United States Patent and Trademark Office*